United States Patent
Kobiki (10) Patent No.: US 9,714,500 B2
(45) Date of Patent: Jul. 25, 2017

(54) WHEEL LOADER

(71) Applicant: KOMATSU LTD., Minato-ku, Tokyo (JP)

(72) Inventor: Yasuhiro Kobiki, Hiratsuka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 14/786,420

(22) PCT Filed: Apr. 2, 2014

(86) PCT No.: PCT/JP2014/059782
§ 371 (c)(1),
(2) Date: Oct. 22, 2015

(87) PCT Pub. No.: WO2014/175027
PCT Pub. Date: Oct. 30, 2014

(65) Prior Publication Data
US 2016/0102445 A1    Apr. 14, 2016

(30) Foreign Application Priority Data
Apr. 26, 2013    (JP) .................................. 2013-094217

(51) Int. Cl.
*B60K 17/10*    (2006.01)
*E02F 9/20*    (2006.01)
(Continued)

(52) U.S. Cl.
CPC ................ *E02F 9/20* (2013.01); *B60K 17/10* (2013.01); *B60K 17/344* (2013.01);
(Continued)

(58) Field of Classification Search
None
See application file for complete search history.

(56) References Cited

U.S. PATENT DOCUMENTS 7,503,172 B2 *   3/2009   Sakakura ............... B60K 17/10
                                                          180/242
2007/0163253 A1   7/2007   Sakakura et al.
(Continued)

FOREIGN PATENT DOCUMENTS

CN    101010527    8/2007
CN    101138964    3/2008
(Continued)

OTHER PUBLICATIONS

International Search Report dated Jul. 1, 2015 from corresponding International Patent Application No. PCT/JP2014/059782, 4 pages.
(Continued)

*Primary Examiner* — Katy M Ebner
(74) *Attorney, Agent, or Firm* — Fish & Richardson P.C.

(57) ABSTRACT

A wheel loader includes: a mechanical drive unit; an HST pump that feeds a hydraulic oil for travelling; an accessory hydraulic pump that feeds a hydraulic oil for a bucket; first and second hydraulic motors driven by the hydraulic oil from the HST pump; and a power combining unit configured to combine powers of the first and second hydraulic motors with a power of the mechanical drive unit, in which the mechanical drive unit is provided between an engine shaft to an output shaft with a shaft center, the power combining unit is configured to combine the power of the mechanical drive unit with the powers of the first and second hydraulic motors at a position above the output shaft, and the first and second combining gears and a gear, to which combined powers are transmitted, are disposed between the first and second hydraulic motors and the output shaft.

6 Claims, 9 Drawing Sheets

(51) Int. Cl.
*F16H 47/04* (2006.01)
*B60K 17/344* (2006.01)
*B60K 17/356* (2006.01)
*E02F 3/28* (2006.01)
*E02F 3/42* (2006.01)
*E02F 9/22* (2006.01)
*F16H 37/08* (2006.01)

(52) U.S. Cl.
CPC ........... *B60K 17/356* (2013.01); *E02F 3/283* (2013.01); *E02F 3/422* (2013.01); *E02F 9/202* (2013.01); *E02F 9/2292* (2013.01); *F16H 47/04* (2013.01); *B60Y 2200/415* (2013.01); *F16H 2037/0886* (2013.01); *F16H 2200/2005* (2013.01); *Y02T 10/76* (2013.01)

(56) References Cited

U.S. PATENT DOCUMENTS

| | | |
|---|---|---|
| 2008/0053736 A1 | 3/2008 | Yasuda et al. |
| 2008/0096712 A1* | 4/2008 | Hiraki .................. B60K 6/365 475/5 |
| 2010/0204001 A1 | 8/2010 | Legner |
| 2011/0178684 A1* | 7/2011 | Umemoto ............. F16H 61/421 701/51 |
| 2012/0058854 A1 | 3/2012 | Shiozaki et al. |
| 2013/0275027 A1 | 10/2013 | Umemoto et al. |
| 2014/0378274 A1 | 12/2014 | Umemoto et al. |

FOREIGN PATENT DOCUMENTS

| | | | |
|---|---|---|---|
| CN | 102422056 | | 4/2012 |
| DE | 102007057534 | | 6/2009 |
| JP | 2000130558 | | 5/2000 |
| JP | 2000130558 A | * | 5/2000 |
| JP | 2011033192 | | 2/2011 |
| JP | 2011149497 | | 8/2011 |
| JP | 2012132289 | | 7/2014 |
| WO | WO 2009/067998 | | 6/2009 |

OTHER PUBLICATIONS

Office Action in corresponding Chinese Application No. 201480020908.7, dated Jan. 24, 2017, 10 pages (with English translation).

European Search Report for corresponding European Application No. 14788688.1, dated May 17, 2017, 5 pages.

* cited by examiner

WHEEL LOADER

CROSS-REFERENCE TO RELATED APPLICATIONS

This application claims priority to International Application No. PCT/JP2014/059782 filed on Apr. 2, 2014, which application claims priority to Japanese Application No. 2013-094217, filed on Apr. 26, 2013. The contents of the above applications are incorporated herein by reference in their entireties.

TECHNICAL FIELD

The present invention relates to a wheel loader provided with a transmission capable of switching between hydraulic actuation and mechanical actuation.

BACKGROUND ART

A typical power transmission system of a wheel loader generally includes: an engine mounted to a rear-vehicle-body frame; a transmission configured to receive rotation power of the engine to shift gears; a rear axle that is attached to the rear-vehicle-body frame transmission in the rear of the transmission and houses a differential; a propeller shaft that connects an output shaft of the transmission to an input shaft of the differential; a pair of axle shafts that respectively project from the rear axle to the right and left sides thereof; and rear tires supported by outer ends of the axle shafts (for instance, Patent Literature 1).

In a small-sized wheel loader, the transmission is often provided by a hydraulic static transmission (HST). In a middle-sized wheel loader, a so-called automatic transmission in which a torque converter and a planetary mechanism are combined is mainly used.

CITATION LIST

Patent Literature(s)

Patent Literature 1: JP-A-2012-132289

SUMMARY OF THE INVENTION

Problem(s) to be Solved by the Invention

In order to improve controllability and a fuel efficiency of the wheel loader, it is desired that an HST requiring no gear-shifting operation and providing a sufficient power is used for travelling at a low speed and during the operation in which tractive force is required due to a large running load, and a mechanical transmission exhibiting a favorable transmission efficiency of a drive force is used for travelling at a predetermined speed or more.

However, in such an arrangement in which the HST and the mechanical transmission are combined, the arrangement becomes complicated in order to obtain an optimum number of transmission gears and an optimum transmission gear ratio, which causes an entire transmission to be increased in size. Moreover, since a cab where an operator is to be seated is provided on an upper portion of a rear vehicle body frame, a space in the rear vehicle body frame is limited. Accordingly, it is difficult to dispose such a large-sized transmission in the rear vehicle body frame.

An object of the invention is to provide a wheel loader provided with a transmission in which a hydraulically driven part and a mechanically driven part exist without any functional problem and that can be favorably disposed in a rear vehicle body frame.

Means for Solving the Problem(s)

According to a first aspect of the invention, a wheel loader includes: an engine; a drive shaft; and a transmission including an input shaft through which a power from the engine is inputted and an output shaft through which the power from the engine is outputted to the drive shaft, the transmission being configured to perform a gear-shifting operation between the input shaft and the output shaft; in which the transmission includes: a mechanical drive unit including a plurality of gear trains driven by the power from the engine; a travel hydraulic pump for a hydraulic static transmission, which is configured to be driven by the input shaft to feed a hydraulic oil for traveling; an accessory hydraulic pump that is provided coaxially with the travel hydraulic pump or provided through a power take-off device positioned above the input shaft and is configured to feed a hydraulic oil for working equipment; a hydraulic motor configured to be driven by the hydraulic oil fed from the travel hydraulic pump; and a power combining unit configured to combine a power of the hydraulic motor with a power of the mechanical drive unit, in which the mechanical drive unit is disposed between the input shaft and the output shaft, the power combining unit is configured to combine the power of the mechanical drive unit and the power of the hydraulic motor at a position above the output shaft, and the gear trains through which the combined power is transmitted are disposed with use of a space between the travel hydraulic pump and the output shaft that are vertically positioned.

According to a second aspect of the invention, a shaft center of the input shaft and a shaft center of the output shaft are positioned on a vertical center line, and a shaft center of a rotary shaft of the power take-off device provided at the highest position is positioned on a line extending from the shaft center of the input shaft to be inclined by a predetermined angle with respect to the center line.

According to a third aspect of the invention, an axial center of the input shaft and an axial center of the output shaft are positioned on a vertical center line, the hydraulic motor is provided by a pair of first hydraulic motor and second hydraulic motor, and the first hydraulic motor and the second hydraulic motor are disposed on right and left sides with respect to the center line.

It should be noted that the first hydraulic motor and the second hydraulic motor are only required to be disposed separately on the right and left sides. Specifically, the first hydraulic motor may be provided on the left side and the second hydraulic motor may be provided on the right side. Alternatively, the first hydraulic motor may be provided on the right side and the second hydraulic motor may be provided on the left side.

According to a fourth aspect of the invention, a wheel loader includes: an engine; a drive shaft; and a transmission including an input shaft through which a power from the engine is inputted and an output shaft through which the power from the engine is outputted to the drive shaft, the transmission being configured to perform a gear-shifting operation between the input shaft and the output shaft, in which the transmission includes: a mechanical drive unit including a plurality of gear trains driven by the power from the engine; a travel hydraulic pump for a hydraulic static transmission, which is configured to be driven by the input shaft to feed a hydraulic oil for traveling; an accessory hydraulic pump that is provided coaxially with the travel hydraulic pump or provided through a power take-off device positioned above the input shaft and that feeds a hydraulic oil for working equipment; a first hydraulic motor and a second hydraulic motor configured to be driven by the hydraulic oil fed from the travel hydraulic pump; and a power combining unit configured to combine powers of the first and second hydraulic motors with a power of the mechanical drive unit, in which the mechanical drive unit includes: a pair of first and second gears attached to the input shaft; a first clutch provided between the first and second gears; an intermediate shaft provided below the input shaft; a pair of third and fourth gears attached to the intermediate shaft and meshing with the first and second gears; a second clutch provided between the third and fourth gears, a fifth gear attached to the intermediate shaft; a combining shaft provided below the intermediate shaft; a sixth gear attached to the combining shaft and meshing with the fifth gear; a first combining gear attached to the combining shaft; a second combining gear provided adjacent to the first combining gear; a third clutch provided between the first combining gear and the second combining gear; and a seventh gear attached to the output shaft and meshing with the first combining gear, the mechanical drive unit being provided between the input shaft and the output shaft, a part of the power combining unit associated with the first hydraulic motor includes: a sun gear attached to a first motor output shaft of the first hydraulic motor; a plurality of planetary gears arranged around the sun gear and meshing with the sun gear; a gear-shaped carrier on which the planetary gears are supported; a ring gear disposed to surround outer circumferences of the planetary gears and mesh with the planetary gears, the ring gear rotating coaxially with the first motor output shaft; a fourth clutch disposed between the ring gear and a transmission casing; and the first combining gear meshing with the carrier, a part of the power combining unit associated with the second hydraulic motor includes: an eighth gear attached to a second output shaft of the second hydraulic motor; the second combining gear meshing with the eighth gear; the first combining gear; and the third clutch, the power combining unit is configured to combine the power of the mechanical drive unit and the powers of the first and second hydraulic motors at a position above the output shaft, and the gear trains through which the combined power is transmitted are disposed with use of a space between the travel hydraulic pump and the output shaft that are vertically positioned.

According to the first aspect of the invention, since the mechanical drive unit is interposed between the input shaft and the output shaft, a travel hydraulic pump above the mechanical drive unit necessarily projects toward an opposite side from a side where the engine is disposed, so that an empty space is generated under the travel hydraulic pump. With this arrangement, the power fed from the hydraulic motor and the power fed from the mechanical drive unit are combined at the position above the output shaft. Accordingly, the space under the travel hydraulic pump can be efficiently utilized for disposing a hydraulic motor and for disposing the gear trains after the combination of the powers, and/or the power combining unit can be housed in the mechanical drive unit without protruding from above and below the mechanical drive unit. Consequently, even in comparison with a typical mechanical transmission, the transmission in which an additional travel hydraulic pump and hydraulic motor or components of the power combining unit do not protrude from above and below the mechanical drive unit and the hydraulically driven part and the mechanically driven part coexist can be favorably disposed in a limited space.

According to the second aspect of the invention, the power take-off device positioned above the mechanical drive unit projects at the highest position. Since the shaft center of the power take-off device is disposed on a line inclined with respect to the center line, the power take-off device is slightly laterally inclined, so that an upward projection amount of the power take-off device can be reduced. Accordingly, a vertical size of the transmission can be reduced, so that the transmission can be more reliably disposed in a limited space. Particularly, interference between the power take-off device and components disposed above the power take-off device can be avoided, so that a member for a roll-over protective structure can be provided without difficulty.

According to the third aspect of the invention, since the first hydraulic motor and the second hydraulic motor are not disposed at positions where the first hydraulic motor and the second hydraulic motor are vertically overlapped but are disposed on the right and left sides with respect to the center line in a manner to be spaced apart from each other, an increase in a vertical size of the transmission can be more reliably restrained.

According to the fourth aspect of the invention, the object of the invention can be achieved and, by switching the first to fourth clutches, the transmission can achieve the gear-shifting operation of the first gear and the second gear by hydraulic driving and the gear-shifting operation of the third gear and the fourth gear by the mechanical drive unit.

DESCRIPTION OF EMBODIMENT(S)

First Exemplary Embodiment

A first exemplary embodiment of the invention will be described below with reference to the attached drawings.

Figure 1:
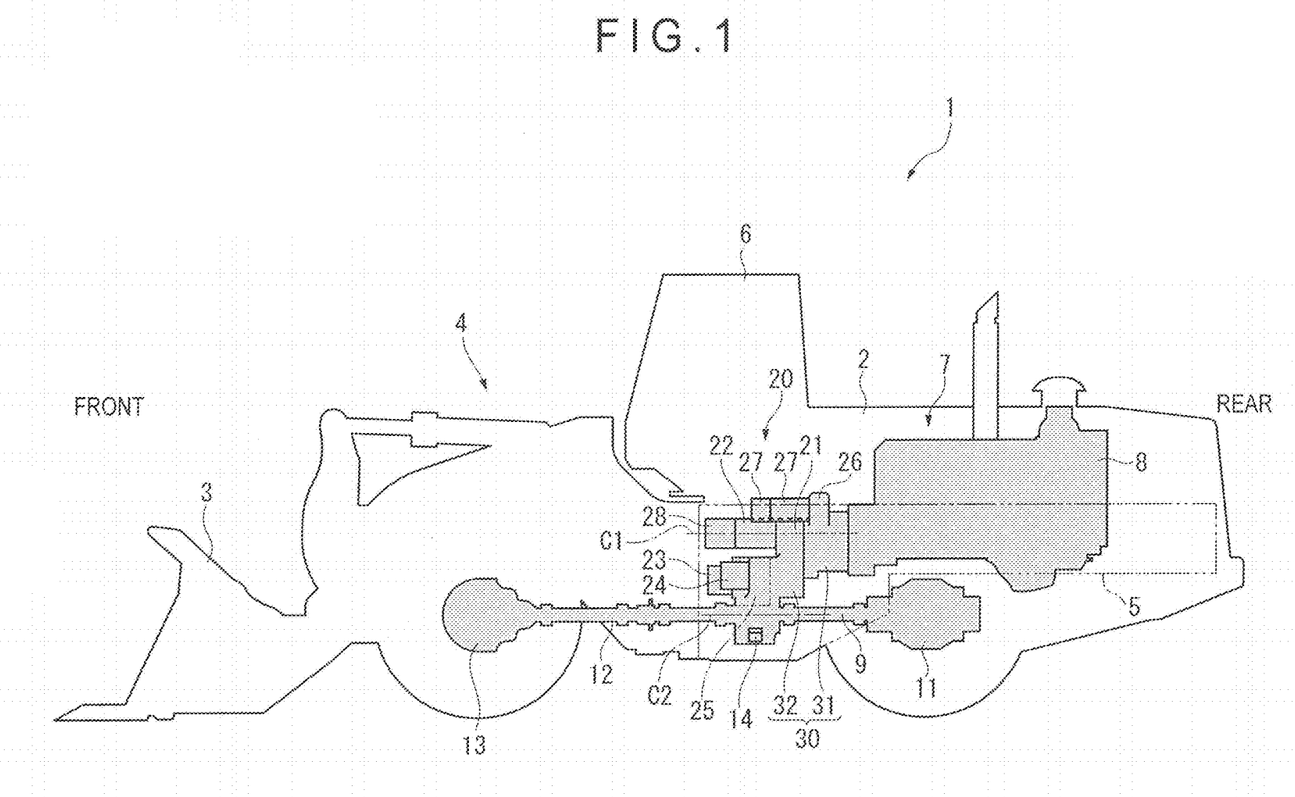
FIG. 1 schematically illustrates a wheel loader according to a first exemplary embodiment of the invention and a power transmission system thereof.

FIG. 1 is a transparent view schematically illustrating a wheel loader 1 according to the first exemplary embodiment and a power transmission system thereof for traveling. It should be noted that directions of front, rear, right and left hereinafter mean directions of front, rear, right and left from an operator seated in a cab 6 shown in FIG. 1.

Overall Arrangement of Wheel Loader

As shown in FIG. 1, the wheel loader 1 is substantially the same as a typical wheel loader except, for instance, an arrangement of a transmission 20 (described later) and appearance. Specifically, the wheel loader 1 includes: a vehicle body 2 including a front vehicle body and a rear vehicle body; and a bucket 3, which is working equipment for excavation and loading, attached to a front side of the front vehicle body through a hydraulic working equipment drive mechanism 4 including, for instance, a boom, a bell crank, a connecting link, a bucket cylinder and a boom cylinder.

The rear vehicle body includes a rear vehicle body frame 5 (shown by a two-dot chain line in FIG. 1) made of, for instance, a thick metal plate. The box-shaped cab 6 where an operator is to be seated is provided on a front upper portion of the rear vehicle body frame 5. The transmission 20 is provided at a front lower portion of the rear vehicle body frame 5. An engine compartment 7 is provided at a rear side of the rear vehicle body frame 5.

Overall Arrangement of Power Transmission System

In the engine compartment 7, a power source, i.e., a diesel engine (hereinafter, simply referred to as "engine") 8 is mounted. In the wheel loader 1, an axial direction of a crankshaft of the engine 8 is parallel with a front-rear direction of the vehicle body, and power of the engine 8 is outputted through a flywheel 8A (see FIGS. 5 and 6) provided at a front side of the engine 8.

The power outputted through the flywheel 8A is inputted to the transmission 20. A part of the power outputted from the transmission 20 is transmitted to a rear axle 11 through a rear drive shaft 9 and to rear wheels. Another part of the power outputted from the transmission 20 is transmitted to a front axle 13 through a front drive shaft 12 and to front wheels.

Arrangement of Transmission

In the exemplary embodiment, the transmission 20 is capable of switching between mechanical drive and hydraulic drive for transmitting the power inputted from the engine 8 to the drive shafts 9, 12. The transmission 20 thus includes a mechanical drive unit 21 that transmits the power through gear trains; a hydraulic static transmission (HST) pump 22 (a hydraulic pump for travelling) that feeds a hydraulic oil for the hydraulic drive; first hydraulic motor 23 and second hydraulic motor 24 that are driven by the hydraulic oil fed from the HST pump 22; and a power combining unit 25 that combines power inputted from the first hydraulic motor 23 and the second hydraulic motor 24 and the power inputted from the mechanical drive unit 21.

The transmission 20 includes a power take-off device (PTO) 26 disposed near a power input side (i.e., near the engine 8). The PTO 26 is connected to a pair of hydraulic pumps 27, 27 to drive the hydraulic pumps 27, 27. The transmission 20 further includes an accessory hydraulic pump 28 that feeds a hydraulic oil for driving the working equipment drive mechanism 4.

The transmission 20 includes a transmission casing 30 supported by the rear vehicle body frame 5. The transmission casing 30 is formed as a half divided structure including a first casing 31 that houses the PTO 26 and a part of the mechanical drive unit 21 and a second casing 32 that houses the rest of the mechanical drive unit 21 and the power combining unit 25. The hydraulic pumps 27, 27 are coaxially arranged and attached to the first casing 31. The HST pump 22 and the accessory hydraulic pump 28 are coaxially arranged and attached to the second casing 32. The first hydraulic motor 23 and the second hydraulic motor 24 are also attached to the second casing 32.

Layout of Each Unit of Transmission and Relationship with Frame

Figure 2:
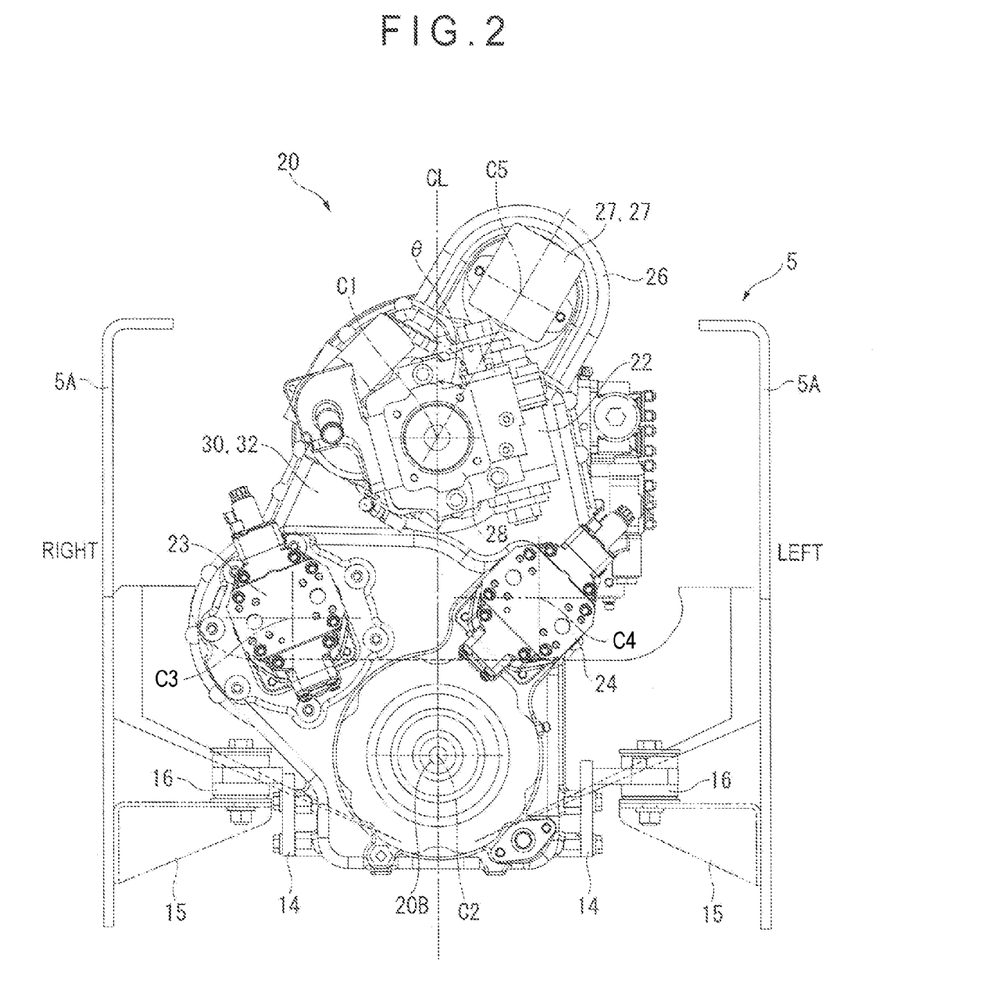
FIG. 2 is a front view showing a transmission according to the first exemplary embodiment.

FIG. 2 is a front view showing the transmission 20.

In FIGS. 1 and 2, an L-shaped attachment piece 14 is bolted to each of a right lower portion and a left lower portion of the second casing 32 of the transmission casing 30. A support bracket 15 is provided to an inner side of each of side frames 5A that are right and left components forming the rear vehicle body frame 5. A rubber mount 16 is provided on the support bracket 15. The attachment piece 14 is attached to the rubber mount 16, whereby the entire transmission 20 is supported by the side frames 5A.

In the transmission 20 supported by the rear vehicle body frame 5, a shaft center C1 (herein, in alignment with shaft centers of the HST pump 22 and the accessory hydraulic pump 28) of an engine shaft 20A (an input shaft) of the transmission 20 (see FIGS. 3 to 5) and a shaft center C2 of an output shaft 20B for power output are positioned on a center line CL passing through a center of the rear vehicle body frame 5 in the right-left direction. The mechanical drive unit 21 of the transmission 20 is vertically disposed between the engine shaft 20A with the shaft center C1 and the output shaft 20B with the shaft center C2.

The first hydraulic motor 23 and the second hydraulic motor 24 are disposed on the right and left sides with respect to the center line CL. Specifically, a shaft center C3 of the first hydraulic motor 23 is positioned at the right side with respect to the center line CL while a shaft center C4 of the second hydraulic motor 24 is positioned at the left side with respect to the center line CL. The shaft center C3 and the shaft center C4 are positioned above the shaft center C2 of the output shaft 20B. Accordingly, in the power combining unit 25 that combines powers of the first hydraulic motor 23 and the second hydraulic motor 24 and a power of the mechanical drive unit 21, the powers of the first hydraulic motor 23 and the second hydraulic motor 24 are inputted from right and left sides with respect to the mechanical drive unit 21 above the shaft center C2.

The power combining unit 25 combines the power driven by the HST and the power of the mechanical drive unit 21 through a first combining gear 52 and a second combining gear 53 (see FIGS. 5 to 7) that are disposed in a subsequent stage of the mechanical drive unit 21. In the first exemplary embodiment including the first hydraulic motor 23 and the second hydraulic motor 24, the power combining unit 25 combines the power of the motors 23, 24 through the first combining gear 52 and the second combining gear 53 (see FIGS. 5 to 7). Accordingly, the first combining gear 52 and the gear 2 are not only components of the mechanical drive unit 21 but also components of the power combining unit 25. Consequently, the first combining gear 52, the second combining gear 53, and a gear 55, by which the combined power is transmitted, form a gear train in the subsequent stage of the mechanical drive unit 21. The gear train is disposed utilizing a space defined between the output shaft 20B with the shaft center C2 and the hydraulic devices provided by the HST pump 22 and the accessory hydraulic pump 28.

A shaft center C5 of a PTO shaft 26A (FIG. 5) of the PTO 26, which is at the highest position and, herein, in alignment with the shaft center of the hydraulic pump 27, is positioned on a line inclined to the left by an inclination angle θ (approximately 30 degrees) with respect to the center line CL of the engine shaft 20A. The shaft center C5 is positioned above the side frames 5A. In this arrangement, a cross member 5B (FIG. 5) is provided extending between upper portions of the right and left side frames 5A in a form of a bridge across the PTO 26.

A frame for ROPS (roll-over protective structure) is vertically provided to the cross member 5B. Since the PTO 26 with this arrangement projects upward, the PTO 26 is close to the cross member 5B. However, since the PTO 26 is disposed in a manner inclined to the left side, a height of the PTO 26 is decreased to avoid mutual interference. In an arrangement in which an upward projection amount of the PTO 26 is simply reduced, the position of the hydraulic pump 27 connected to the PTO 26 is lowered to interfere with an upper portion of the second casing 32 of the transmission casing 30. Moreover, since the position of the gear projecting at the highest position in the PTO 26 is shifted in a front-back direction with respect to the cross member 5B, a larger clearance between the PTO 26 and the cross member 5B is ensured.

Details of Mechanical Drive Unit

Figure 3:
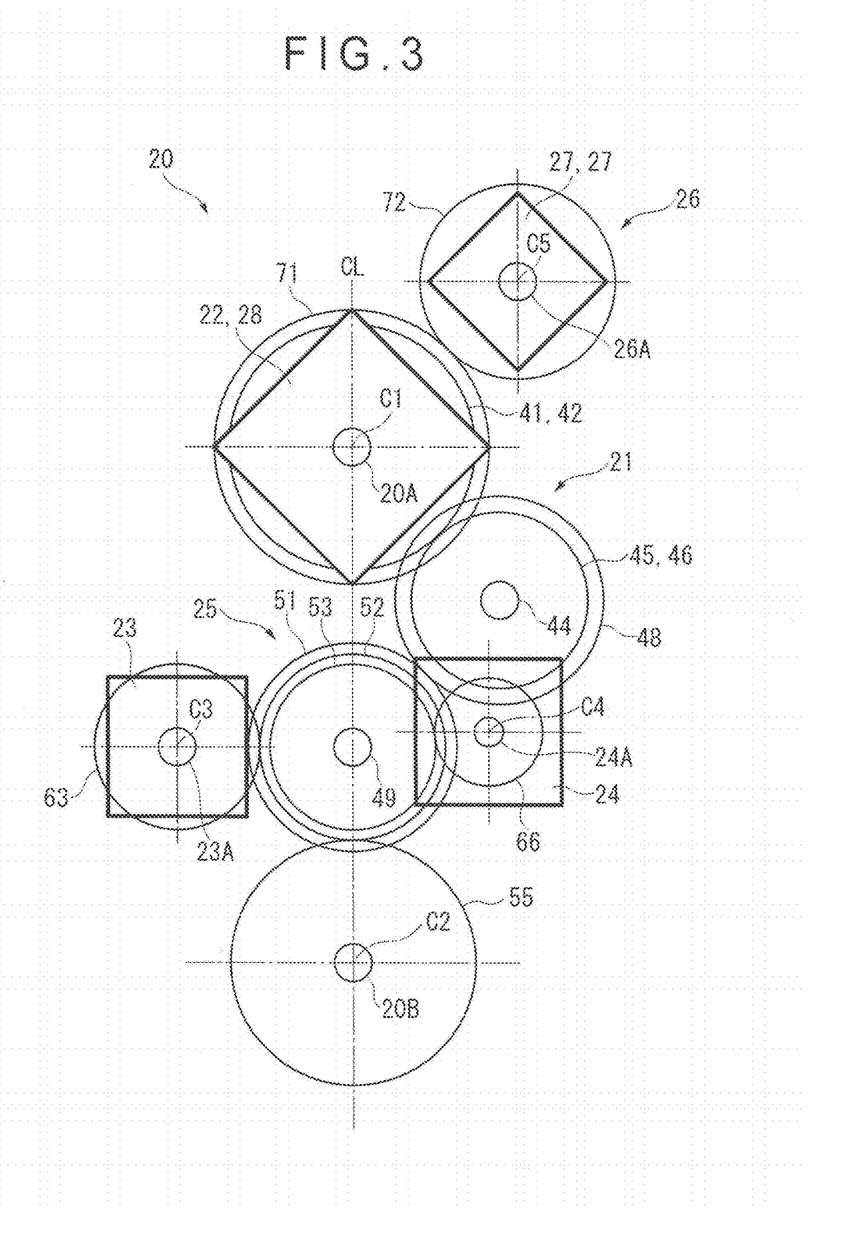
FIG. 3 is a front view schematically showing a power transmission route in the transmission.
Figure 4:
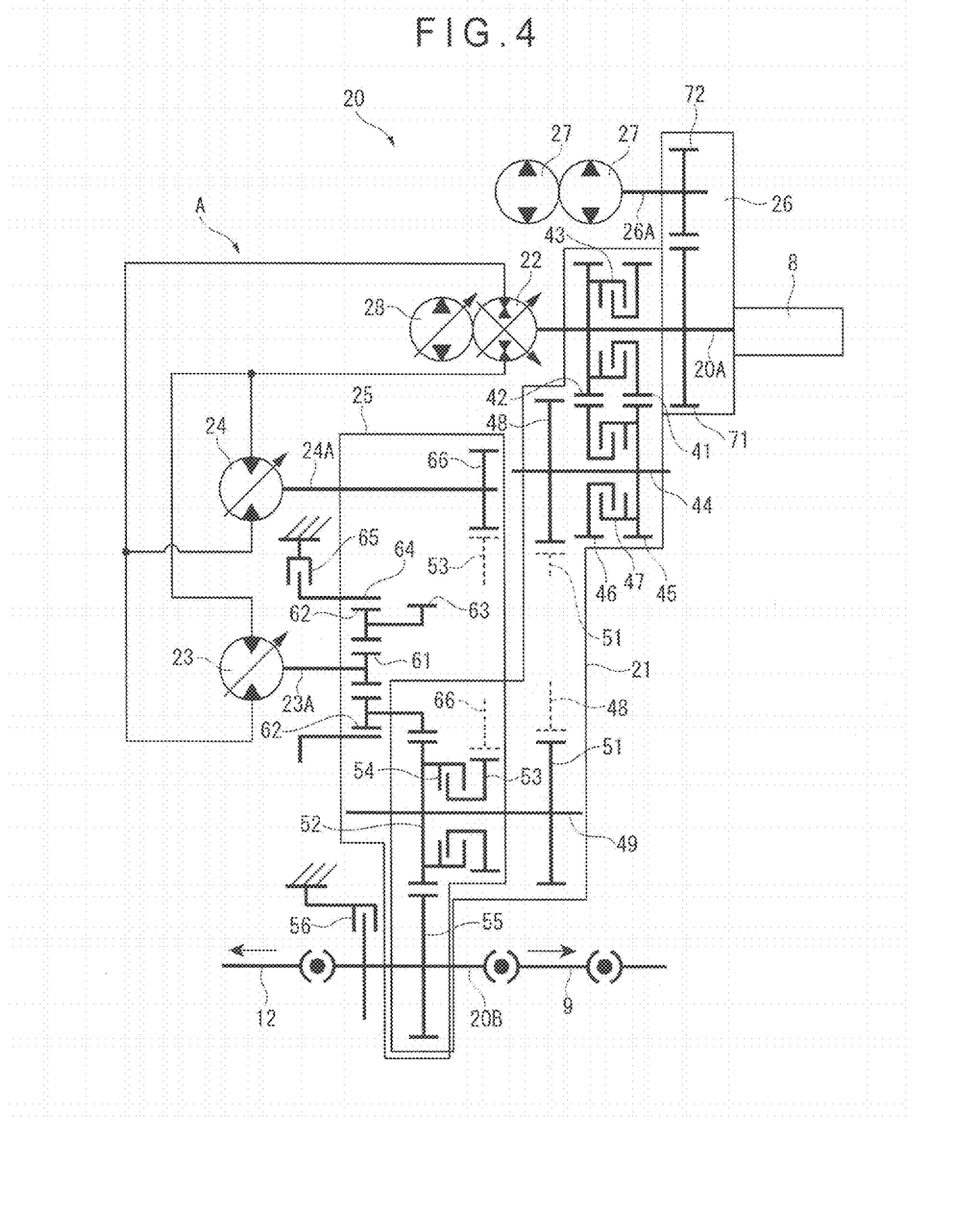
FIG. 4 is a lateral view schematically showing the power transmission route in the transmission.
Figure 5:
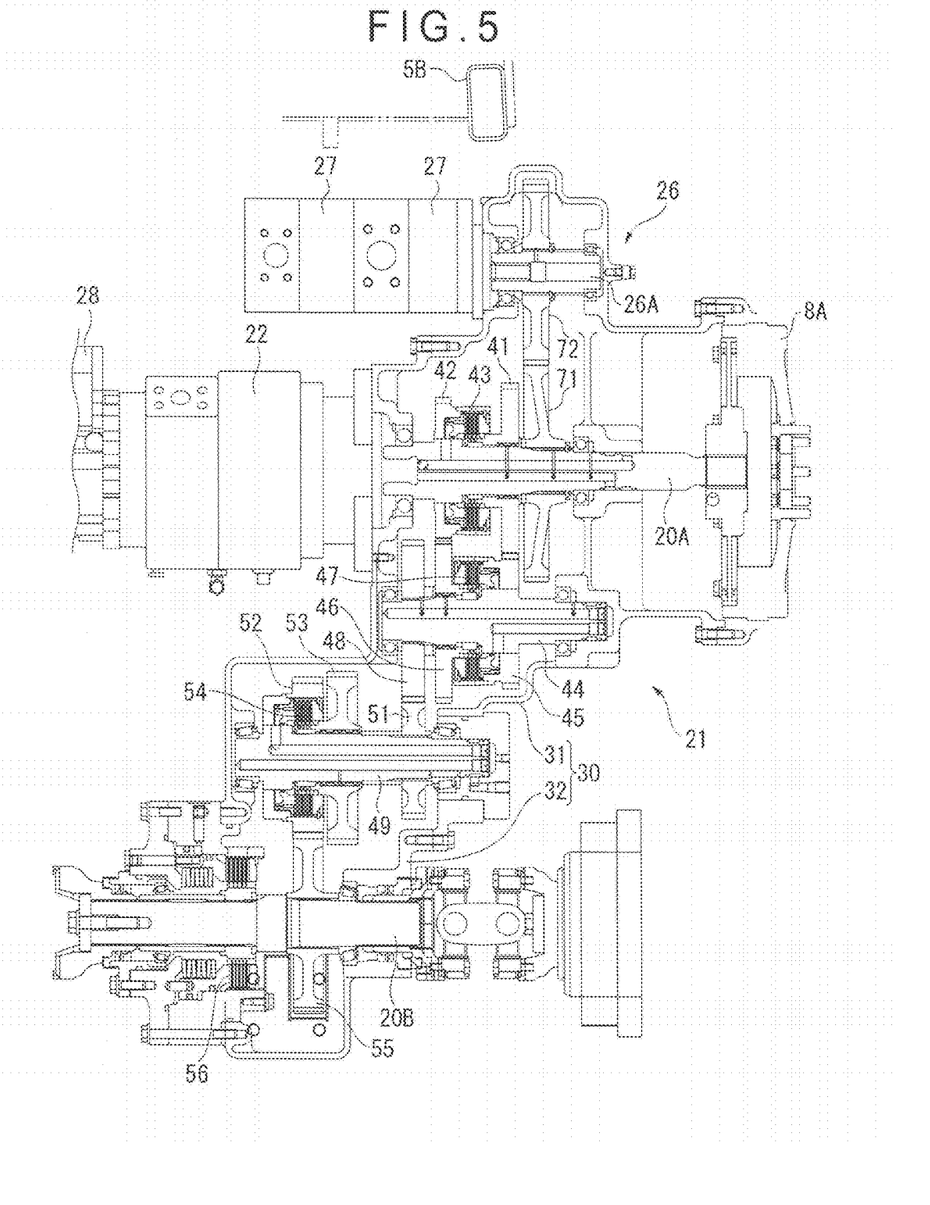
FIG. 5 is a cross-sectional view showing a power drive unit of the transmission.

FIGS. 3 and 4 schematically illustrate a power transmission route in the transmission 20. FIG. 5 is a cross-sectional view showing the mechanical drive unit 21 of the transmission 20.

In FIGS. 3 to 5, the flywheel 8A of the engine 8 is connected to an engine shaft 20A of the transmission 20.

The mechanical drive unit 21 includes: a pair of gears 41 and 42 attached to the engine shaft 20A; a clutch 43 provided between the gears 41 and 42; an intermediate shaft 44 provided below the engine shaft 20A and shifted to the left side with respect to the center line CL; a pair of gears 45 and 46 attached to the intermediate shaft 44 and meshing with the gears 41 and 42; a clutch 47 provided between the gears 45 and 46; a gear 48 also attached to the intermediate shaft 44; a combining shaft 49 provided below the intermediate shaft 44 and positioned on the center line CL; a gear 51 attached to the combining shaft 49 and meshing with the gear 48; the first combining gear 52 also attached to the combining shaft 49; the second combining gear 53 provided adjacent to the first combining gear 52; a clutch 54 provided between the first combining gear 52 and the second combining gear 53; and the gear 55 attached to the output shaft 20B and meshing with the first combining gear 52.

The gears 41, 42, 45, 46, 48, 51 and 55 are respectively first to seventh gears according to the first exemplary embodiment. Here, the clutches 43, 47 and 54 are respectively first to third clutches according to the first exemplary embodiment.

The clutches 43, 47 and 54 are multi-plate hydraulic wet clutches. A clutch 65 (described later) is also a multi-plate hydraulic wet clutch. Since the gear 42 is fixed to the engine shaft 20A, rotation of the gear 42 is transmitted to the gear 41 by engaging the clutch 43. Since the gear 45 is fixed to the intermediate shaft 44, rotation of the gear 46 is transmitted to the gear 45 by engaging the clutch 47. Since the first combining gear 52 is fixed to the combining shaft 49, rotation of the second combining gear 53 is transmitted to the first combining gear 52 by engaging the clutch 54. In the exemplary embodiment, the output shaft 20B is provided with a multi-plate parking brake 56.

Figure 7:
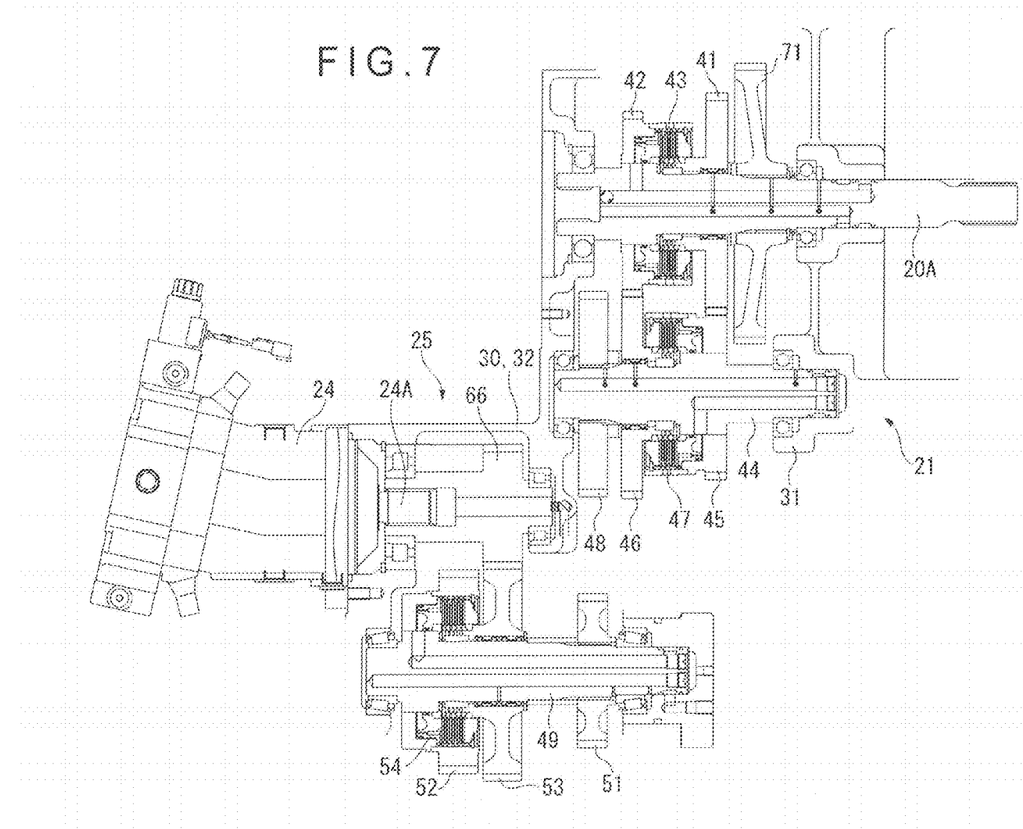
FIG. 7 is a cross-sectional view showing the power combining unit of the transmission associated with a second hydraulic motor.

It should be noted that although FIG. 4 shows that the gear 48 and the gear 51 are spaced from each other and the second combining gear 53 and a gear 66 (described later) are spaced from each other for a reason of drawing, these gears actually mesh with each other as shown in FIGS. 5 and 7.

Power Transmission of Mechanical Drive Unit

In the exemplary embodiment, the transmission 20 is configured to be shifted into first to fourth forward gears (low speed to high speed) and first to second reverse gears (low speed to high speed). The mechanical drive unit 21 is configured to be switched between the third and fourth forward gears by the operation of the clutches 43 and 47. The clutch 54 is always disengaged when the mechanical drive unit 21 transmits the power.

Firstly, at the third forward gear in the mechanical drive unit 21, the clutch 43 is disengaged while the clutch 47 is engaged. In the above state, since the gear 41 does not rotate, the power inputted to the engine shaft 20A is transmitted from the gear 42 to the gear 46, from the gear 46 to the gear 45 through the clutch 47 and further to the gear 48 through the intermediate shaft 44. The power is then transmitted from the gear 48 to the first combining gear 52 through the gear 51 and the combining shaft 49, from the first combining gear 52 to the gear 55, and further to the output shaft 20B. Since the clutch 43 is disengaged, the gear 41, which meshes with the gear 45, rotates idly around the engine shaft 20A.

Next, at the fourth forward gear in the mechanical drive unit 21, the clutch 43 is engaged while the clutch 47 is disengaged. In the above state, the power inputted to the engine shaft 20A is transmitted from the gear 42 to the gear 41 through the clutch 43, from the gear 41 to the gear 45 and further to the gear 48 through the intermediate shaft 44. The power is further transmitted in the same manner as when the third forward gear is selected. Since the clutch 47 is disengaged, the gear 46, which meshes with the gear 42, rotates idly around the intermediate shaft 44.

At the third forward gear, although the speed is decelerated by the power transmission by the meshing between the gears 42 and 46, transmission torque is large. In contrast, at the fourth forward gear, although the speed is accelerated by the power transmission by the meshing between the gears 41 and 45, transmission torque is small.

The HST pump 22 is driven even when the power is transmitted by the mechanical drive unit 21. However, the swash plate angle of the swash-plate type HST pump 22 is set at zero degrees not to discharge the hydraulic oil. With this arrangement, the HST pump 22 is driven with substantially no load. Consequently, the power consumption of the HST pump 22 is sufficiently reduced to be ignored.

Details of HST Pump

As shown in FIGS. 4 and 5, the HST pump 22 is connected to the engine shaft 20A along with an accessory pump 28. The HST pump 22 is a swash-plate type variable displacement pump, in which a swash plate is inclinable to both of positive-angle side and negative-angle side with reference to a swash plate angle of zero degrees. A discharge direction of the hydraulic oil from the HST pump 22 changes and, consequently, rotation directions of the first hydraulic motor 23 and the second hydraulic motor 24 change depending on the swash plate angle, which is set positive or negative over or below zero degrees. When a pressure at an outlet side becomes higher than a pressure at an inlet side in the HST pump 22, the HST pump 22 functions as a hydraulic motor to adversely bias the engine 8 so that engine brake is applied.

Details of Hydraulic Motor

The first hydraulic motor 23 and the second hydraulic motor 24, which are angled-piston type variable displacement motors as shown in FIG. 4, are juxtaposed to each other in a hydraulic circuit A including the HST pump 22. The respective rotation directions of the first hydraulic motor 23 and the second hydraulic motor 24 can be switched by changing the discharge direction of the hydraulic oil from the HST pump 22. Specifically, the normal rotation of the first hydraulic motor 23 and the second hydraulic motor 24 makes the wheel loader 1 travel forward, whereas the inverse rotation makes the wheel loader 1 reverse.

Details of Power Combining Unit

Figure 6:
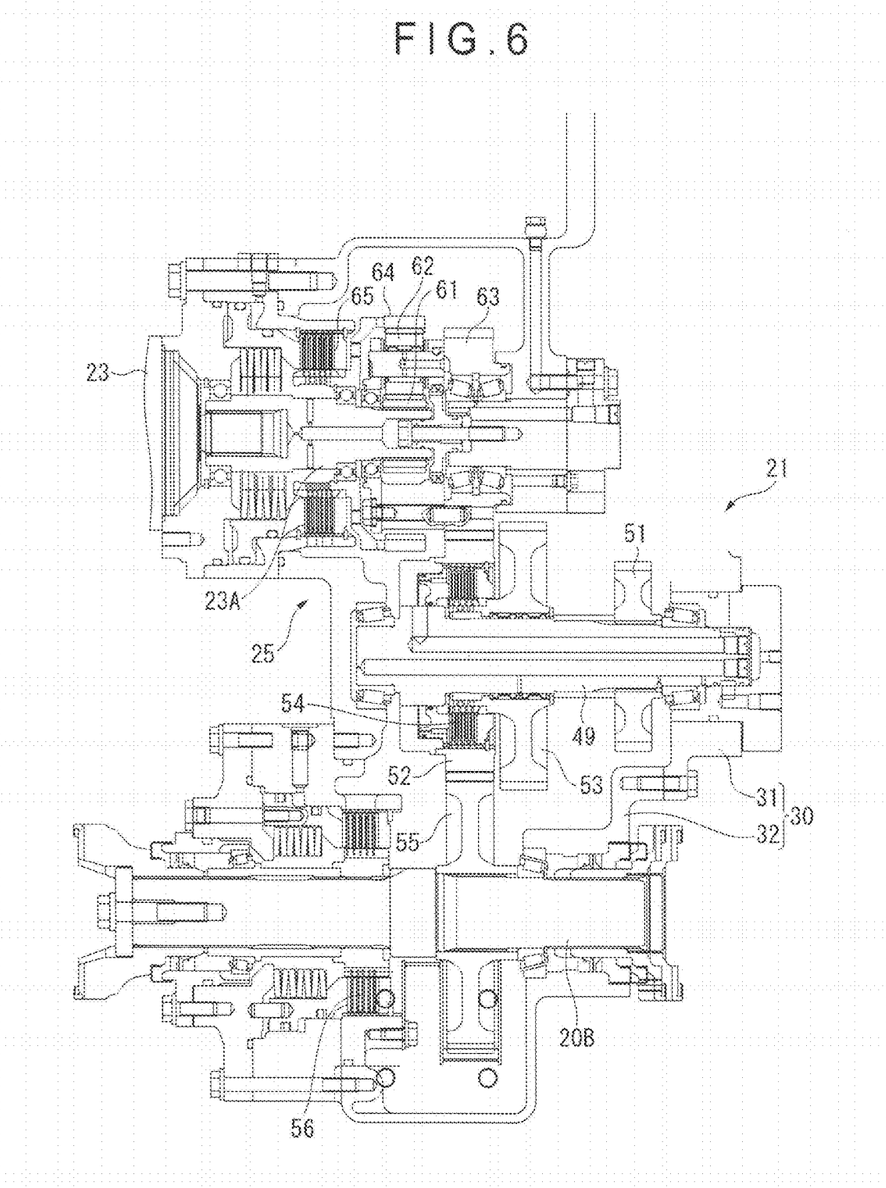
FIG. 6 is a cross-sectional view showing a power combining unit of the transmission associated with a first hydraulic motor.

A part of the power combining unit 25 associated with the first hydraulic motor 23 will be described with reference to FIGS. 4 and 6. The power combining unit 25 associated with the first hydraulic motor 23 includes a planetary mechanism. Specifically, the power combining unit 25 includes: a sun gear 61 attached to a first motor output shaft 23A of the first hydraulic motor 23; a plurality of planetary gears 62 arranged around the sun gear 61 and meshing with the sun gear 61; a gear-shaped carrier 63 on which the planetary gears 62 are supported; a ring gear 64 disposed to surround outer circumferences of the planetary gears 62 and mesh with the planetary gears 62, the ring gear 64 rotating coaxially with the first motor output shaft 23A; a clutch 65 (the fourth clutch) disposed between the ring gear 64 and a transmission casing 30; and the first combining gear 52 meshing with the carrier 63.

Next, a part of the power combining unit 25 associated with the second hydraulic motor 24 will be described with reference to FIGS. 4 and 7. The power combining unit 25 associated with the second hydraulic motor 24 includes: the gear 66 (the eighth gear) attached to a second output shaft 24A of the second hydraulic motor 24; the second combining gear 53 meshing with the gear 66; the first combining gear 52; and the clutch 54. It should be noted that although FIG. 7 shows that the gear 48 and the gear 51 are spaced from each other for a reason of drawing, these gears actually mesh with each other as described above.

However, with the above-described power combining unit 25, when the power is transmitted by the mechanical drive unit 21, the clutches 54, 65 are disengaged and the angled piston angle of each of the first hydraulic motor 23 and the second hydraulic motor 24 is set at zero degrees. When the clutch 65 is not disengaged, the rotation of the first combining gear 52 may be unexpectedly accelerated by the planetary mechanism to adversely bias the first hydraulic motor 23 at an excessively high speed. Accordingly, also in terms of the durability of the first hydraulic motor 23, it is preferable that the clutch 65 is disengaged while the angled piston angle is set at zero degrees.

Power Transmission by HST

The HST using the HST pump 22, the first hydraulic motor 23, and the second hydraulic motor 24 transmits power to the first and second forward gears and the first and second reverse gears. As shown in FIGS. 4, 6 and 7, at the first forward gear and the first reverse gear, the clutches 43, 47 of the mechanical drive unit 21 are disengaged and thus no power is transmitted through the mechanical drive unit 21. On the other hand, the clutches 54, 65 are engaged. In this state, the power of the first hydraulic motor 23 and the power of the second hydraulic motor 24 are inputted to the first combining gear 52 and the second combining gear 53, which are also components of the power combining unit 25, and are combined.

Specifically, the power of the first hydraulic motor 23 driven by the hydraulic oil from the HST pump 22 is transmitted to the planetary gears 62 through the sun gear 61. Since the ring gear 64 is immobilized by the clutch 65 and thus not rotated, the planetary gears 62 each revolve around the sun gear 61 while rotating on its own axis. Simultaneously, the carrier 63 rotates at a reduced speed. The power of the first hydraulic motor 23 is thus transmitted to the first combining gear 52 through the carrier 63. The power of the second hydraulic motor 24 is transmitted to the second combining gear 53 through the gear 66 and further to the first combining gear 52 through the clutch 54 and is combined with the power of the first hydraulic motor 23 in the first combining gear 52. The combined power is transmitted from the first combining gear 52 to the output shaft 20B through the gear 55.

In contrast, at the second forward gear and the second reverse gear, the clutch 54 is engaged while the clutch 65 of the first hydraulic motor 23 is disengaged, and the angled piston angle of the first hydraulic motor 23 is set at zero degrees. Consequently, no output from the first hydraulic motor 23 is provided, and power transmission from the first combining gear 52 to the first hydraulic motor 23 is inhibited. The power of the second hydraulic motor 24 is thus reliably transmitted to the output shaft 20B.

During traveling at the second forward gear or the first forward gear, engine brake is applied, for instance, when the engine speed of the engine 8 is rapidly reduced or the vehicle rolls down a steep slope. Specifically, in the above situations, the power transmitted from the tires exceeds the power outputted from the power combining unit 25, so that the first hydraulic motor 23 and the second hydraulic motor 24, which are in conjunction with each other through the clutches 54, 65, are adversely biased with an increased speed to function as hydraulic pumps. Consequently, the inlet side of the HST pump 22 receives the inflow of a hydraulic oil with a higher pressure than a hydraulic oil at the outlet side, so that the HST pump 22 functions as a hydraulic motor. The engine 8 is thus adversely biased by the HST pump 22 to apply engine brake.

Switching of Power Transmission

For instance, a V-shape operation including traveling forward while performing excavation using the bucket 3 and traveling forward or reversing for a short distance with a load, the first forward gear or the first reverse gear of the HST drive is usually selected due to a large running load. When the wheel loader 1 travels for a middle distance or when the vehicle speed needs to be increased with a large running load (e.g., snow removal), the second forward gear or the second reverse gear of the HST drive is selected. When the vehicle is unloaded and travels with a small running load (e.g., traveling up a slope), the third forward gear of the mechanical drive is selected. When the wheel loader 1 travels on a flat ground with a slight running load, the forward fourth gear of the mechanical drive is selected. Although the wheel loader 1 is not supposed to reverse under the mechanical drive in the exemplary embodiment, a reverse gear may be provided to allow the wheel loader 1 to reverse under the mechanical drive.

The gears are switched by an operator performing a shift operation to set a shift lever into corresponding gear positions. The clutches 43, 47, 54 and 65 are operated according to the selected gear position, whereby the power is appropriately transmitted. Moreover, it is also possible that, by setting the shift lever into a gear position at a so-called drive range, the clutches 43, 47, 54 and 65 are operated based on the automatically determined running-load, whereby the gear positions are automatically switched.

When the second forward gear is switched to the third forward gear, for instance, the first combining gear 52, which is being rotated by the power driven by the HST, is also rotated by the power of the mechanical drive unit 21, although temporarily. Since both of the powers rotate the first combining gear 52 and subsequent components, the powers are combined in the power combining unit 25. The same applies to switching of the third forward gear to the second forward gear.

Details of PTO

Referring back to FIG. 5, the PTO 26 includes: a gear 71 attached to the engine shaft 20A; a gear 72 that meshes with the gear 71; and a PTO shaft 26A that is a rotary shaft attached with the gear 72. In the exemplary embodiment, the PTO shaft 26A is connected to a pair of hydraulic pumps 27. The PTO 26 is in operation whenever the engine 8 is driven. It should be noted that the hydraulic pumps 27 are optional components and may thus be omitted. In this case, the PTO shaft 26A rotates idly with substantially no load. Other device(s) may be connected to the PTO shaft 26A in place of the hydraulic pumps 27.

Second Exemplary Embodiment

Figure 8:
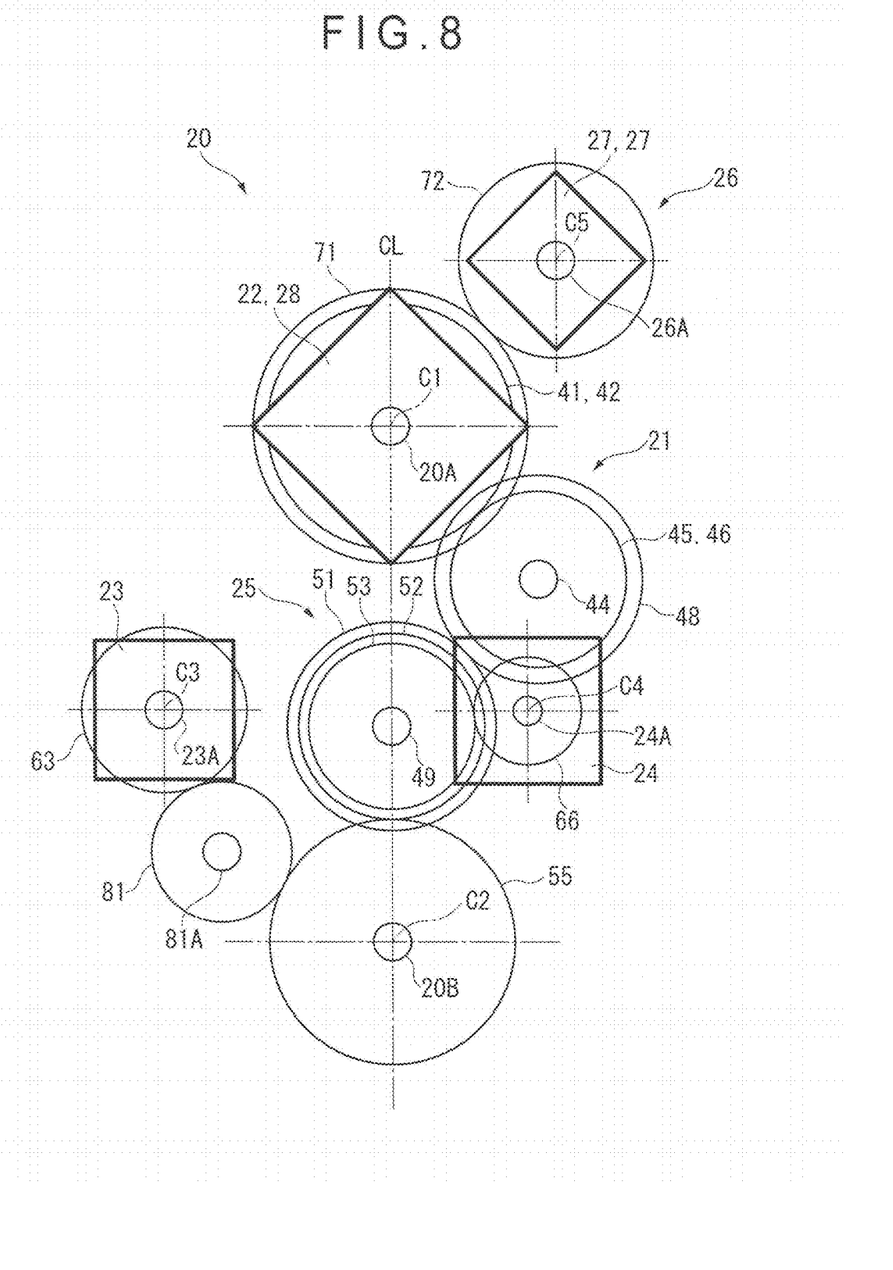
FIG. 8 is a front view schematically showing a power transmission route in a transmission according to a second exemplary embodiment of the invention.

FIG. 8 illustrates a second exemplary embodiment of the invention.

FIG. 8 illustrates an arrangement in which the power of the first hydraulic motor 23 is inputted to the gear 55 at the lowest stage through an idle gear 81 attached to an idler shaft 81A. Even in this arrangement, the position where the power is inputted to the gear 55 by the idle gear 81, in other words, the position where the powers are combined is positioned above the output shaft 20B.

Tractive force and the like required to drive the HST becomes large, whereby the first hydraulic motor 23 and the HST pump 22 positioned above the first hydraulic motor 23 are increased in size, which may cause mutual interference. Accordingly, the power of the first hydraulic motor 23 is designed to be transmitted to the gear 55 through the idle gear 81, so that the first hydraulic motor 23 can be spaced apart from the HST pump 22 to avoid mutual interference.

Third Exemplary Embodiment

Figure 9:
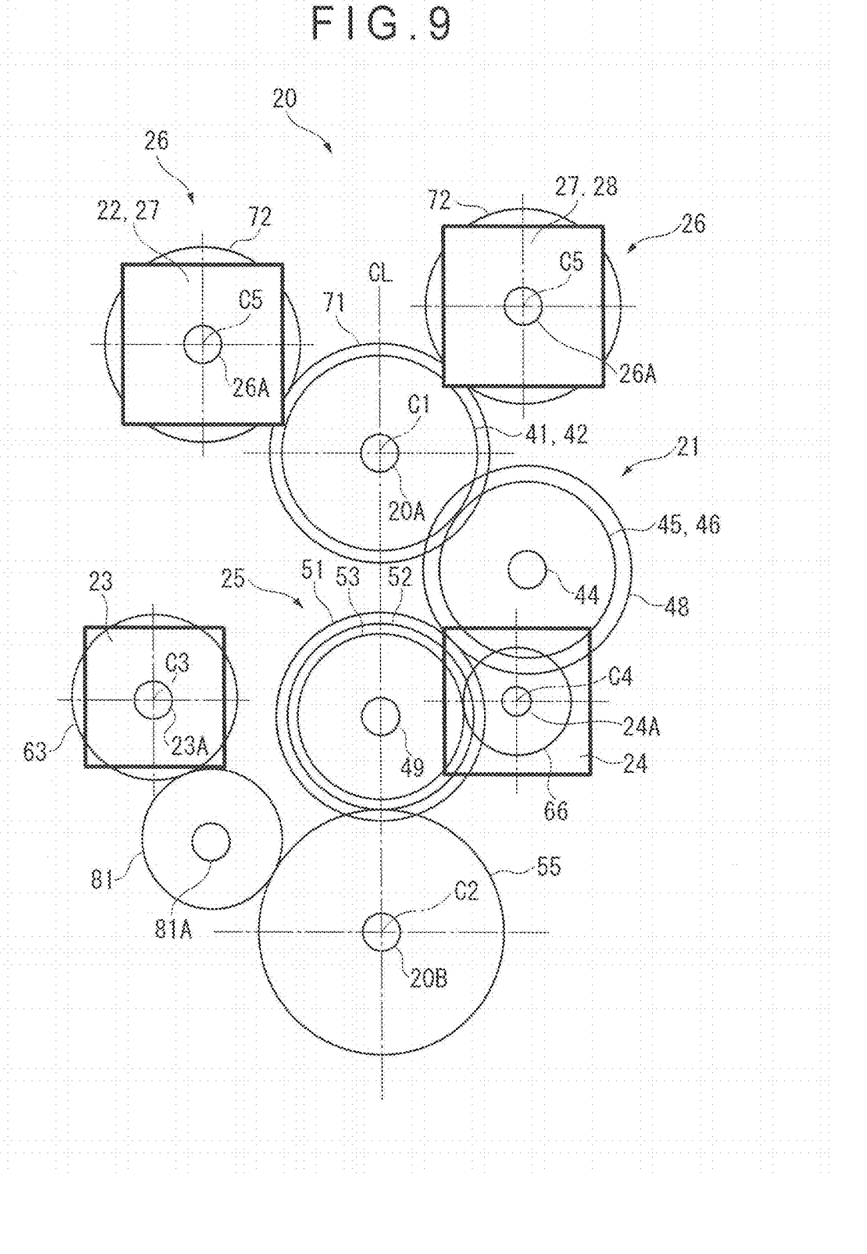
FIG. 9 is a front view schematically showing a power transmission route in a transmission according to a third exemplary embodiment of the invention.

FIG. 9 illustrates a third exemplary embodiment of the invention.

FIG. 9 illustrates an arrangement in which the PTO shafts 26A are provided on the right and left sides with respect to the center line CL, a first one of the PTO shafts 26A being connected to the hydraulic pump 27 and the HST pump 22, a second one of the PTO shafts 26A being connected to the hydraulic pump 27 and the accessory hydraulic pump 28.

It is conceivable that the accessory hydraulic pump 28 is also increased in size in association with an increased in size of the HST pump 22. In such a case, the HST pump 22 and the accessory hydraulic pump 28 may interfere with a region in which the power combining unit 25 of the transmission casing 30 is housed or may excessively protrude forward and not be housed in the rear vehicle body frame 5. For this reason, a pair of PTO shafts 26A are respectively connected to the HST pump 22 and the accessory hydraulic pump 28, whereby a forward projection amount of each of the HST pump 22 and the accessory hydraulic pump 28 can be restricted, so that interference thereof with other components can be reliably prevented.

It should be understood that the scope of the present invention is not limited to the above-described exemplary embodiment(s) but includes modifications and improvements compatible with the invention.

For instance, although the above exemplary embodiments employ the two hydraulic motors, i.e., the first hydraulic motor 23 and the second hydraulic motor 24, a single hydraulic motor for traveling, for instance, only the first hydraulic motor 23 may be employed without departing from the scope of the invention.

Alternatively, three or more hydraulic motors for traveling may be employed without departing from the scope of the invention.

In the first exemplary embodiment, the first hydraulic motor 23 and the second hydraulic motor 24 are disposed on the right and left sides and the respective powers thereof are inputted to the first combining gear 52 and the second combining gear 53. However, the power of the first hydraulic motor 23 may be inputted to the gear 55 while the power of the second hydraulic motor 24 may be inputted to another gear adjacent to the gear 55 via a clutch.

In the above exemplary embodiments, the intermediate shaft 44 is shifted leftward with respect to the center line CL, whereby the height of the gear train is reduced. However, the combining shaft 49 may further be shifted rightward with respect to the center line CL to further reduce the height. However, since the gear train is positioned close to the first and second hydraulic motors 23 and 24, interference therebetween needs to be considered.

INDUSTRIAL APPLICABILITY

The invention is suitably applicable to a wheel loader.

EXPLANATION OF CODE(S)

1 . . . wheel loader, 3 . . . bucket (working equipment), 8 . . . engine, 9 . . . rear drive shaft (drive shaft), 12 . . . front drive shaft (drive shaft), 20 . . . transmission, 20A . . . engine shaft (input shaft), 20B . . . output shaft, 21 . . . mechanical drive unit, 22 . . . HST pump (hydraulic pump for travelling), 23 . . . first hydraulic motor, 23A . . . first motor output shaft, 24 . . . second hydraulic motor, 24A . . . second motor output shaft, 25 . . . power combining unit, 26 . . . power take-off device (PTO), 26A . . . PTO shaft (rotary shaft), 28 . . . accessory hydraulic pump, 30 . . . transmission casing, 41 . . . gear (first gear), 42 . . . gear (second gear), 43 . . . clutch (first clutch), 44 . . . intermediate shaft, 45 . . . gear (third gear), 46 . . . gear (fourth gear), 47 . . . clutch (second clutch), 48 . . . gear (fifth gear), 49 . . . combining shaft, 51 . . . gear (sixth gear), 52 . . . first combining gear, 53 . . . second combining gear, 54 . . . clutch (third clutch), 55 . . . gear (seventh gear), 61 . . . sun gear, 62 . . . planetary gear, 63 . . . carrier, 64 . . . ring gear, 65 . . . clutch (fourth clutch), 66 . . . gear (eighth gear), C1 to C5 . . . shaft center, CL . . . center line, θ . . . inclination angle.

The invention claimed is:

1. A wheel loader comprising:
an engine;
a drive shaft; and
a transmission comprising an input shaft through which a power from the engine is inputted and an output shaft through which the power from the engine is outputted to the drive shaft, the transmission being configured to perform a gear-shifting operation between the input shaft and the output shaft, wherein
the transmission comprises:
a mechanical drive unit comprising a plurality of gear trains driven by the power from the engine;
a travel hydraulic pump for a hydraulic static transmission, which is configured to be driven by the input shaft to feed a hydraulic oil for traveling;
an accessory hydraulic pump that is provided coaxially with the travel hydraulic pump or provided through a power take-off device positioned above the input shaft and that feeds a hydraulic oil for working equipment;
a first hydraulic motor and a second hydraulic motor configured to be driven by the hydraulic oil fed from the travel hydraulic pump; and
a power combining unit configured to combine powers of the first and second hydraulic motors with a power of the mechanical drive unit, wherein
the mechanical drive unit comprises: a pair of first and second gears attached to the input shaft; a first clutch provided between the first and second gears; an intermediate shaft provided below the input shaft; a pair of third and fourth gears attached to the intermediate shaft and meshing with the first and second gears; a second clutch provided between the third and fourth gears, a fifth gear attached to the intermediate shaft; a combining shaft provided below the intermediate shaft; a sixth gear attached to the combining shaft and meshing with the fifth gear; a first combining gear attached to the combining shaft; a second combining gear provided adjacent to the first combining gear; a third clutch provided between the first combining gear and the second combining gear; and a seventh gear attached to the output shaft and meshing with the first combining gear, the mechanical drive unit being provided between the input shaft and the output shaft,
a part of the power combining unit associated with the first hydraulic motor comprises: a sun gear attached to a first motor output shaft of the first hydraulic motor; a plurality of planetary gears arranged around the sun gear and meshing with the sun gear; a gear-shaped carrier on which the planetary gears are supported; a ring gear disposed to surround outer circumferences of the planetary gears and mesh with the planetary gears, the ring gear rotating coaxially with the first motor output shaft; a fourth clutch disposed between the ring gear and a transmission casing; and the first combining gear meshing with the carrier,
a part of the power combining unit associated with the second hydraulic motor comprises: an eighth gear attached to a second output shaft of the second hydraulic motor; the second combining gear meshing with the eighth gear; the first combining gear; and the third clutch,
the power combining unit is configured to combine the power of the mechanical drive unit and the powers of the first and second hydraulic motors at a position above the output shaft, and
the gear trains through which the combined power is transmitted are disposed with use of a space between the travel hydraulic pump and the output shaft that are vertically positioned.

2. The wheel loader according to claim 1, wherein
a shaft center of the input shaft and a shaft center of the output shaft are positioned on a vertical center line.

3. The wheel loader according to claim 1, wherein
a shaft center of a rotary shaft of the power take-off device provided at the highest position with respect to the input shaft and the output shaft is positioned on a line extending from the shaft center of the input shaft to be inclined by a predetermined angle with respect to a vertical line.

4. The wheel loader according to claim 1, wherein
the first hydraulic motor and the second hydraulic motor are disposed on right and left sides, respectively, of the input and output shafts.

5. The wheel loader according to claim 1, wherein
a shaft center of the input shaft and a shaft center of the output shaft are positioned on a vertical center line, and
a shaft center of a rotary shaft of the power take-off device provided at the highest position with respect to the input shaft and the output shaft is positioned on a line extending from the shaft center of the input shaft to be inclined by a predetermined angle with respect to the center line.

6. The wheel loader according to claim 1, wherein
an axial center of the input shaft and an axial center of the output shaft are positioned on a vertical center line, and
the first hydraulic motor and the second hydraulic motor are disposed on right and left sides with respect to the center line.

* * * * *